(12) United States Patent
Blackmon et al.

(10) Patent No.: US 7,758,280 B2
(45) Date of Patent: Jul. 20, 2010

(54) COMPOSITION AND METHOD FOR STABILIZING ROAD BASE

(75) Inventors: Donald Blackmon, Milwaukie, OR (US); Gerald Shealy, Chapin, SC (US); Billy Keith Jones, Cashiers, NC (US)

(73) Assignee: EnviRoad, LLC, Portland, OR (US)

( * ) Notice: Subject to any disclaimer, the term of this patent is extended or adjusted under 35 U.S.C. 154(b) by 0 days.

(21) Appl. No.: 12/192,026

(22) Filed: Aug. 14, 2008

(65) Prior Publication Data

US 2008/0300346 A1 Dec. 4, 2008

Related U.S. Application Data

(62) Division of application No. 11/181,582, filed on Jul. 13, 2005, now abandoned.

(51) Int. Cl.
*E01C 7/36* (2006.01)
(52) U.S. Cl. .................. 404/76; 106/705; 106/900; 106/DIG. 1
(58) Field of Classification Search ............... 106/705, 106/DIG. 1, 900; 404/32, 76
See application file for complete search history.

(56) References Cited

U.S. PATENT DOCUMENTS

| | | | | |
|---|---|---|---|---|
| 2,698,252 A * | 12/1954 | Havelin et al. | ............... | 106/706 |
| 3,713,856 A | 1/1973 | McConnaughay | | |
| 3,868,263 A | 2/1975 | McConnaughay | | |
| 3,921,628 A | 11/1975 | Smythe et al. | | |
| 4,229,329 A | 10/1980 | Bennett | | |
| 4,240,952 A | 12/1980 | Hulbert, Jr. et al. | | |
| 4,410,367 A | 10/1983 | Legrand | | |
| 5,024,702 A | 6/1991 | Mazuch et al. | | |
| 5,340,391 A | 8/1994 | Grzybowski | | |
| 5,405,440 A | 4/1995 | Green et al. | | |
| 5,412,007 A | 5/1995 | Hendrix et al. | | |
| 5,482,550 A | 1/1996 | Strait | | |
| 5,503,871 A | 4/1996 | Blacklidge et al. | | |
| 6,019,830 A | 2/2000 | Yap et al. | | |
| 6,190,447 B1 | 2/2001 | Phillips et al. | | |
| 6,387,175 B1 * | 5/2002 | Lynn et al. | ................ | 106/790 |
| 6,960,253 B2 | 11/2005 | Radtke, Jr. | | |
| 7,118,624 B2 * | 10/2006 | Polston | ................ | 106/697 |
| 2002/0197109 A1 * | 12/2002 | Grubba et al. | ................ | 404/31 |
| 2003/0164119 A1 | 9/2003 | Naji et al. | | |
| 2004/0168611 A1 | 9/2004 | Dresin et al. | | |
| 2005/0116198 A1 | 6/2005 | Ryan et al. | | |
| 2005/0135879 A1 | 6/2005 | Grubba et al. | | |
| 2006/0127185 A1 | 6/2006 | Fauteux | | |
| 2006/0288908 A1 | 12/2006 | Polston | | |

FOREIGN PATENT DOCUMENTS

| | | |
|---|---|---|
| AU | 743067 | 9/2001 |
| JP | 54068838 | 6/1979 |

(Continued)

*Primary Examiner*—Paul Marcantoni
(74) *Attorney, Agent, or Firm*—Alleman Hall McCoy Russell & Tuttle LLP

(57) ABSTRACT

A mixture, comprising of fly ash and an emulsion, where said emulsion is mixed with said fly ash in a range of 5% to 50% of fly ash per an area of a square yard and 0.5 gallons to 2.5 gallons per square yard of the emulsion to said area.

18 Claims, 2 Drawing Sheets

FOREIGN PATENT DOCUMENTS

| | | |
|---|---|---|
| JP | 57016070 | 1/1982 |
| JP | 60199060 | 10/1985 |
| JP | 62218448 | 9/1987 |
| JP | 1247492 | 10/1989 |
| JP | 4161460 | 6/1992 |
| JP | 5311000 | 11/1993 |
| JP | 6264077 | 9/1994 |

* cited by examiner

COMPOSITION AND METHOD FOR STABILIZING ROAD BASE

CROSS-REFERENCE TO RELATED APPLICATIONS

The present application is a divisional of U.S. patent application Ser. No. 11/181,582, filed Jul. 13, 2005, entitled "Composition and Method for Stabilizing Road Base" which claims domestic priority to U.S. Provisional Application 60/588,935, filed Jul. 16, 2004, entitled "Composition and Method for Stabilizing Road Base," the entire contents of which are incorporated herein by reference.

FIELD

The present disclosure relates to stabilizers of roadways using a combination of combustion products and emulsions. However, there may be other uses of the disclosed products, such as dust suppressants, soil stabilizers, etc.

BACKGROUND AND SUMMARY

Every year, significant quantities of combustion products, including coal combustion products, are produced, including various types of ash, such as bottom ash, boiler slag and fly ash. These products are considered waste products of coal burning power plants and the issue of how to recycle or otherwise dispose of these products has become a concern. While various methods have been attempted to recycle these materials, (such as using small amounts in concrete), the current applications using such ash are limited due to certain undesirable properties of the ash. Thus, despite years of effort in searching for viable uses of the ash, substantial amounts of the ash go unused and are transported to landfills. The amount of ash that must be transported and then put into such landfills is significant.

The inventors herein have recognized a new approach using ash in road stabilization that takes advantages of the properties of ash. In the new approach, the ash may be used to stabilize various types of road bases, including dirt/gravel roads and sand roads. In one example, a process for the stabilization of roadways uses a combination of ash and an emulsion. One example process comprises mixing 5% to 50% of dry fly ash per square yard and 0.5 gallons to 2.5 gallons per square yard of the emulsion to the same area. The emulsion may be either of a resin base or asphalt base. However, various other ratios may be used, and additional materials may be added to further improve the road stabilization.

In another example, a durable, stabilized road base is obtained using a process that uses the existing roadbed soils, tilling it to a depth of approximately 4-6 inches, blending in approximately 10-25% coal combustion fly ash, introducing a site specific quantity of an emulsion, then grading and roller compacting the materials. The resultant road base may be significantly more stable and stronger than previous methods of stabilizing the road base. Again, the road may be tilled to various other depths, and various ratios of ash and an emulsion may be used. Further, various types of post processing may be used in place of grading an roller compacting, or these acts may not be used, if desired.

Thus, in at least some of the approaches herein, ash that would otherwise be transported to landfills may be beneficially used to improve roadway construction. In some examples, the addition of ash provides for strengthened road bases, while reducing the amount of other more expensive materials that would otherwise be used to create the road base. Further, the ash can provide a stronger surface, without substantial disruption to the environment.

Various other examples are described herein.

Examples of dust suppressants and soil stabilizers are disclosed in U.S. Pat. Nos. 4,001,033; 4,571,116; 4,737,305; 4,801,635; 5,084,207; 5,412,007; and 5,824,725, the disclosures of which are incorporated by reference in their entirety for all purposes.

In another aspect of the disclosure, the inventors herein have found that a mixture of ash, and emulsion, and optionally mixed with soil may provide termite deterrence.

DETAILED DESCRIPTION

As described above, in one example, a coal combustion product, such as ash, may be combined with an emulsion and used in constructing a road base. The ash is a byproduct/waster product of burning coal. There are various types of ash that may be produced by coal-burning plants, including bottom ash, boiler slag, fly ash, and mixtures of such ashes.

Figure 1:
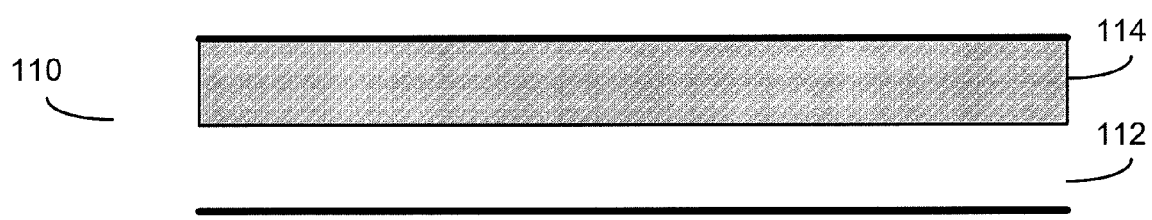
FIG. 1 shows an example road surface.

In one specific example described in detail herein, fly ash may be used with an emulsion to provide an increased stabilized road surface, such as shown in FIG. 1, which shows a road surface 110 including a road bed layer 112 and a second layer 114 including at least ash and an emulsion (which may each be in layers within layer 114, or may be mixed together). Thus, fly ash may be optionally used with an emulsion to prevent erosion of banks or fields. The emulsion may operate to bind the fly ash and retain it in a form which creates a substantially durable hard surface. By mixing the emulsion and fly ash into the roadbed (also referred to herein as the mixing surface), it may be possible to cost-effectively stabilize and improve the durability and life expectancy of the road. The mixture may provide a "concrete-like" or "paved-type" surface.

Briefly, as described above, fly ash is a byproduct of the coal-burning process and is in the form of very fine coal particles. These very fine coal particles may be transported from the combustion chamber by exhaust gases. The fly ash is typically a fine powder-like substance formed from the mineral matter in some coal, including the noncombustible matter in coal plus a small amounts of carbon that remain from incomplete combustion.

In some embodiments, fly ash may comprise mostly silt-sized and clay-sized glassy spheres, with a consistency somewhat like talcum powder. Properties of fly ash may vary with coal composition and plant-operating conditions. For example, the properties of fly ash may vary on different operations within the coal plant, such as selection, carbon reduction, classification, grinding, blending and homogenization.

Further, fly ash can be characterized into different classes depending on its characteristics. For example, ASTM C618 defines two classes of fly ash: F and C. Any of the various types of ash, and specifically fly ash, may be advantageously used in the present disclosure. Moreover, the various types of fly ash may be used depending on the type of surface which the ash may be applied.

To determine if fly ash can be used as an ingredient in base material for roads, the following tests were performed. First, a type of fly ash was selected from three types of available fly ash: ash from wood only, ash from coal only, and ash from coal with limestone added. While all three types of ash can be effectively used to attain a cohesive mixture, ash from coal with limestone added was selected for testing because of hardening qualities demonstrated by limestone.

Then, the following mixture results were obtained. Mixture A: One hundred percent ash with 4:1 mixture of an emulsion (such as the one described below) produces a cohesive mixture, however there may be low strength. Mixture B: 75% clay, 25% ash and a 4:1 mixture with an emulsion (such as the one described below) produces a cohesive mixture, with strength being higher than Mixture A. Mixture C: soil with high organic content mixed at a rate of 75% soil, 25% ash and a 4:1 mixture of an emulsion (such as the one described below herein) produces a cohesive mixture with good strength (better strength than Mixture B). Mixture D: sand clay (as it normally exists in South Carolina and other similar geographical areas) mixed as a rate of up to 70% sand clay and 30% ash provides a good mixture with good strength. As such, the high strength and highly cohesive mixture may be attained with 15% ash, 85% sand clay and 4:1 emulsion (such as the one described below herein). Mixture E: pure sand or so called "sugar sand" mixed at rate of 85% sand, 15% ash with 4:1 emulsion (such as the one described below herein) also produces an extremely high strength and highly cohesive mixture. Mixture F: a limited test conducted with material such as crushed run.

It should be appreciated that the amount of ash and the amount of emulsion may be varied depending on the type of soil or road surface material. Moreover, the amount of emulsion may further be based on the amount of moisture in the soil and/or the fly ash. For example, various classifications of ash may be selected for use on a specific type of soil bed, e.g. sand, dirt/gravel. The amount of emulsion may depend on the classification of the ash. Further, the amount of fly ash may be varied depending on the road surface. For example, for a hard gravel surface, as little as 5% fly ash may be used, while on a sand surface, as much as 50% fly ash may be used. Thus, fly ash may work well with aggregates provided a sufficient amount of ash is used to fill voids around aggregates.

As noted above, one example mixture comprises 5% to 50% of dry fly ash per square yard and 0.5 gallons to 2.5 gallons per square yard of the emulsion to the same area. The emulsion may be either of a resin base or asphalt base. However, various other ranges of dry fly ash per yard may be used, such as 5-10%, 10-20%, 5-20%, 10-25%, 25-45%, 30-50%, 35-50%, 45-50%, etc. Likewise, various other ranges of emulsion gallons per square yard may be used, such as 0.5-1, 1-2, 1-1.5, 0.5-2, 0.5-1.5, etc.

Figure 2:
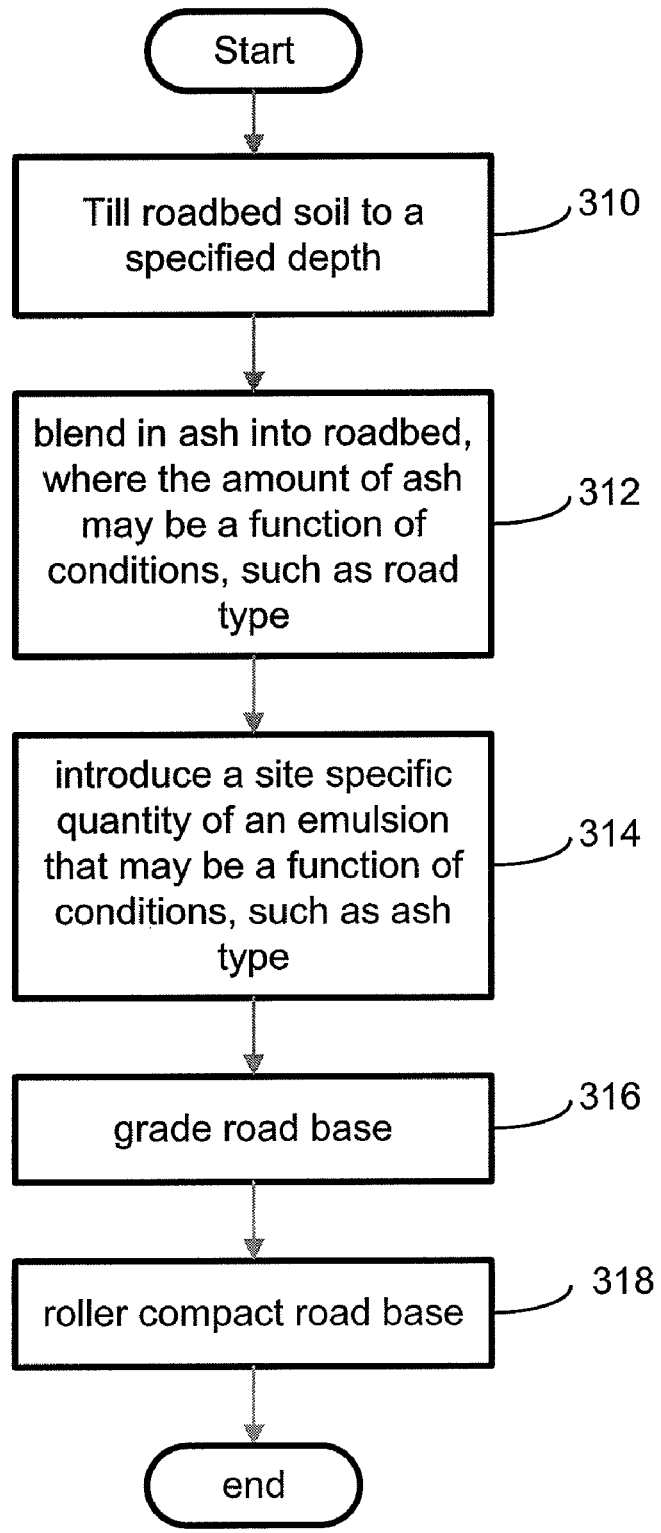
FIG. 2 shows an example mixture process.

As also noted above, a durable, stabilized road base may be obtained using a process such as that described in FIG. 2. In this example, the process uses the existing roadbed soils, tilling it to a depth of approximately 4-6 inches (step 310), blending in approximately 10-25% coal combustion fly ash (step 312), introducing a site specific quantity of an emulsion (step 314), then grading (step 316) and roller compacting (step 318) the road. Depending on the application and the soil material, various tilling depths may be used, such as 1-3 inches, 0.5-5 inches, 5-10 inches, etc. Further, various blends of ash may be introduced, such as 5-50%, 20-30%, 10-40%, 25-50%, 35-45%, etc. By varying the amount of ash, emulsion and tilled soil, the strength of the mixture and the mixed composition may be tailored to the specific needs of the roadway.

By using the fly ash with the emulsion, it may be possible to substantially improve the strength of the road base. By improving the strength of the road base, the durability and life expectancy of roads may be improved. Further, use of the fly ash may substantially reduce the costs of stabilizing roadways. As a waste product, the cost of fly ash is minimal relative to other materials used to stabilize roadways. With such large amounts of the waste product available, this advantageous use of the material enables substantial recycling of a previously hard-to-dispose product.

Also, while the above ranges show exact percentages, there may be some variation in the actual percentage, including 0-10% variation, for example, and as such these ranges may be approximate.

Testing was also done to study if and how an emulsion (such as the one described below) mixed with existing soil and fly ash may affect termites. The soil condition of the subject test soil was heavy clay with a small amount of fine native stone, mostly quartz. The test area was heavily wooded with obvious presence of termite colonies. The material formulation used included: 4 parts native soil taken from a termite infested area, 1 part fly ash from a South Carolina coal plant, added with a sufficient amount of a 50% emulsion to create a mixture consistent with flowable concrete.

The above material was applied to an excavated area 18" long, 12" wide and 4" deep. It was mixed as noted above and placed in the excavated area, along with a 2" section of new white pine 2×4 on top, leaving area exposed to elements. Over the testing period, where results were consistently checked termites were absent from the treated material. Specifically, the test was run for several months, where at time 1 (no evidence of termites); time 2 (two months later) (no evidence of termites); and six months following time 2 (still free of termites).

While the above mixture therefore provides significant termite protection, various other combinations may also be used. For example, the ratio of fly ash to soil may be varied depending on soil moisture and soil type.

Various types of emulsions may be used in the above-disclosed mixtures with the fly ash. Specifically, any suitable resin-based material may be used in the mixture. For example, resin materials having a cast number of 64742-16-1; 64742-11-6; and asphalt 8502-42-4 would be suitable emulsion products.

As an exemplary emulsion, and not as a limitation, one product which may be mixed with the fly ash as the emulsion is EARTHBIND® 100. An example of such a product is described in TABLE A, and is included only for illustrative purposes. It should be appreciated that although an exemplary composition is described in detail, the components and the weight percent of the components within the composition may vary.

One example composition of the emulsion includes a polymeric liquid or resin. Typically, the resin will be a petroleum resin in amounts of approximately 20 wt. % to 80 wt. %. An exemplary composition may include 40 wt. % to 60 wt. % of a petroleum resin as shown in TABLE A.

TABLE A

| Component | Range (wt. %) | Exemplary Composition (wt. %) |
| --- | --- | --- |
| Petroleum resin | 20-80 | 40-60 |
| Lignin sulfonate | 10-60 | 15-45 of an lignin sulfonate |
| Surfactant | 1-20 | 6-8 |
| Water | 0-95 | 0-95 |

Petroleum resins, as used in the composition, may function to bind or adhere to surfaces having various types of soil particles, including sand, gravel and dirt. The petroleum resins may further bind to products such as the fly ash. The petroleum resins may be adapted to bind such particles together for extended periods of time. After application and adherence to a surface, the petroleum resins function as a water-proofing membrane, repelling water off the surface. Although a variety of petroleum resins may be used, petroleum resins having a viscosity in the range of approximately 3000 to 5000 SUS at 210° F. enables the petroleum resin within the composition to develop a substantial film thickness, or mat, over the soil particles upon application. The substantial film provides an increased binding power for the soil particles. The depth of the film further prevents the composition from becoming air borne once it is broken away from the surface of the mat.

As shown in the above table, the composition may optionally also include a stabilizer, such as a liquid lignin sulfonate. Lignin sulfonate, as used herein, is a metallic sulfonate salt made from the lignin of sulfite pulp-mill liquors. Such lignin sulfonate is approximately 20 wt. % to 60 wt. % of the overall composition. Lignin sulfonate may act as a watering agent and as a soil stabilizer to bind to various types of soils and ash. The combination of the petroleum resin and the lignin sulfonate result in a composition that is adapted to provide effectively binding of various types of soils particles and/or ash together. Further, it may also generate a substantially waterproof surface. This binding may further function to mitigate airborne particles and prevent the fly ash from dispersing over time from roadway use.

It should be appreciated that various types of lignin sulfonates may be used. For example, both ammonium lignin sulfonate and/or a calcium lignin sulfonate are suitable lignin sulfonates. It should be appreciated that other types of lignin sulfonates may be used, including, but not limited to sodium lignin sulfonate. The type of lignin sulfonate used may depend on the specific application of the composition. Thus, in the exemplary composition, ammonium lignin sulfonate is identified as a suitable lignin sulfonate, however it should be appreciated that for other road surfaces or conditions a different lignin sulfonate may be used. The ammonium lignin sulfonate of the exemplary composition is shown as being generally 15 wt. % to 45 wt. % of the composition.

In addition to the petroleum resin and the lignin sulfonate, the composition further may include approximately 1 wt. % to 20 wt. % of a surfactant, also referred to herein as the emulsifier. As shown in Table A, in the exemplary composition, the surfactant may be only 6 wt. % to 8 wt. % of the composition.

The surfactant in the composition may optionally be a non-ionic surfactant. For example, alkylphenols, such as a nonylphenol ($C_9H_{19}C_6H_4OH$), may be used as the non-ionic surfactant. The present surfactant functions as an emulsifier which is adapted to wet out various types of soil surfaces (regardless of charge). Unlike an oppositely-charged surfactant system, which is configured to wet only a specific surface type, the present emulsifier may be adapted to wet a variety of surfaces making the overall composition extremely versatile.

In an oppositely-charged surfactant system, the type of particles and/or soil may require use of a different charged emulsifier. For example, with limestone aggregates (having a positive charge on the surface), a negatively-charged emulsifier (anionic) may be required to get the best wetting of the particles. Similarly, a granite surface (having a negative charge on the surface), would require a positively-charged emulsifier (cationic) to get the best wetting of the particles. In the present composition, the non-ionic emulsifier enables maximum wetting of the different types of particles, such as soil. Thus, the non-ionic emulsifier is adapted to wet out both cationic and anionic soils (e.g., limestone and granite, respectively) quickly and more efficiently than using an oppositely-charged surfactant system. It should be appreciated that the wetting of the soil enables the petroleum resin to come into closer contact with individual particles. The ability to come into closer contact may result in more thoroughly coated particles, creating a more weatherproof surface once compacted.

Another consideration regarding the emulsifier is the overall stability of the emulsifier. A good emulsifier for the present composition is a stable product that is easily useable in the field. Further, the emulsifier should be easy to store and transport, such that there are no difficulties in transporting or handling the composition or its components.

The petroleum resin, lignin sulfonate and emulsifier may be mixed in any suitable manner. For example, in some embodiments, the materials may be mixed with a blender or other mixing device. In other embodiments, the materials may be combined using an emulsion mill. For example, the components described above may be ground together using an emulsion process to form an emulsion. The manufacturing of a standard emulsion may be accomplished by adding enough shear force to a product to grind the product into small droplets. The small droplets may then be suspended in the composition. In the present disclosure, the mechanical process of grinding the components together to form an emulsion may be accomplished using a colloid mill or other similar device.

Thus, emulsion of the components may be controlled by use of the colloid mill. By controlling temperature and flow rates, the emulsion process may be controlled to optimize the particle size for emulsion stability and performance of the composition in the field. The optimal particle size may vary depending on the intended application of the product. Typically, the smaller the particle size the better the emulsion.

Upon application to a surface, the emulsion composition is adapted to penetrate the surface, as well as the fly ash. Specifically, the surfactant/emulsifier, when added to water, operates as a wetting agent allowing the composition to penetrate into, or to spread over, the road surface by reducing the surface tension of the water. As described above, the amount of each of the components may vary on the specific intended application, such as the type of surface to be treated. Moreover, the amount of water may vary. Thus, the composition may include anywhere from approximately 0 wt. % to 95 wt. % water.

It should be appreciated that the emulsion product may be stored in a concentrated form and diluted prior to application. For example, the product may be used at water-to-product concentrations of 3:1 to 20:1 depending on the soil type, traffic flow, amount of ash and other environmental factors.

The ranges provided for the petroleum resin, the lignin sulfonate, and the emulsifier are preferred ranges that enable the composition to work with a large number of different types of aggregate roadways and other suitable surfaces for soil stabilization. Although, described in terms of the optimal ranges, it should be noted that the ranges may vary depending on the field conditions, such as the type and amount of aggregate. Thus, the composition may vary where the aggregate includes a large amount of fine particulates. For example, in some field conditions, the petroleum resin, may optimally range from 1 wt. % to 70 wt. %. Similarly, for those same field conditions, the lignin sulfonate may range from 0.5 wt. % to 25 wt. %, while the surfactant may range from 0.2 wt. % to 15 wt. %. Similarly, water, being the carrier solvent, may range between 60 wt. % to 95 wt. %.

The texture of the soil or other particulates may affect the proportion of petroleum resin to lignin sulfonate in the emulsion composition. For example, coarse soil (such as sandy regions) may require a higher proportion of petroleum resin to lignin sulfonate. The larger amount of petroleum resin may prevent the lignin sulfonate from penetrating the surface too quickly. In contrast, finer particles may require more lignin sulfonate, and thus, may have a lower proportion of petroleum resin to lignin sulfonate in the overall emulsion composition compared to an emulsion composition for coarse particles.

It should be noted that none of components in the present composition, including both the emulsion and the fly ash, are listed as hazardous or toxic materials. The composition may be safe to apply and use and may have little or no detrimental effect on the environment.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring, nor excluding, two or more such elements.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

We claim:

1. A road base made from an existing roadbed material and a coal-combustion by-product, the road base comprising:
    a tilled roadbed soil;
    a coal-combustion fly ash blended into the tilled roadbed soil at 5 to 50 percent by weight; and
    a site-specific quantity of an emulsion blended into the tilled roadbed soil after the coal-combustion fly ash, the emulsion including a resin base comprising a petroleum resin at 40 to 60 percent by weight, the site-specific quantity ranging from 0.5 to 2.5 gallons per square yard, depending on a type of the tilled roadbed soil, and further depending on a type of the coal-combustion fly ash.

2. The road base of claim 1, wherein the petroleum resin has a viscosity between 3000 and 5000 saybolt universal seconds at 210 degrees Fahrenheit.

3. The road base of claim 1, wherein the emulsion further comprises a lignin sulfonate at 15 to 45 percent by weight.

4. The road base of claim 3, wherein the lignin sulfonate comprises at least one of an ammonium lignin sulfonate, a calcium lignin sulfonate, and a sodium lignin sulfonate.

5. The road base of claim 1, wherein the emulsion further comprises a surfactant at 6 to 8 percent by weight.

6. The road base of claim 5, wherein the surfactant is a non-ionic surfactant.

7. The road base of claim 6, wherein the non-ionic surfactant is an alkylphenol.

8. The road base of claim 1, wherein the coal-combustion fly ash comprises fly ash from a combustion of coal with limestone added to the coal.

9. A method for stabilizing a road base using a coal-combustion by-product, the method comprising:
    tilling an existing roadbed soil;
    blending an amount of a coal-combustion fly ash into the existing roadbed soil at 5 to 50 percent by weight, the amount depending on a type of the existing roadbed soil; and
    introducing a quantity of an emulsion to the existing roadbed soil at 0.5 to 2.5 gallons per square yard, the emulsion including a resin base comprising a petroleum resin at 40 to 60 percent by weight, the quantity depending on the type of the existing roadbed soil and a type of the coal-combustion fly ash.

10. The method of claim 9, wherein tilling the existing roadbed soil includes tilling to a depth of approximately 4 to 6 inches.

11. The method of claim 9, wherein a tilling depth depends on an application of the road base or on the existing roadbed soil.

12. A method for stabilizing a road base using a coal-combustion by-product, the method comprising:
    tilling an existing roadbed soil;
    blending an amount of a coal-combustion fly ash into the existing roadbed soil at 5 to 50 percent by weight, the amount depending on a type of the existing roadbed soil, with as little as 5 percent by weight for hard gravel, as much as 50 percent by weight for sand, and approximately 10 to 25 percent by weight for an existing roadbed soil tilled to a depth of approximately 4 to 6 inches; and
    introducing a quantity of an emulsion to the existing roadbed soil at 0.5 to 2.5 gallons per square yard, the emulsion including a resin base comprising a petroleum resin at 40 to 60 percent by weight, the quantity depending on the type of the existing roadbed soil and a type of the coal-combustion fly ash.

13. The method of claim 12, further comprising grading the road base.

14. The method of claim 12, further comprising roller compacting the road base.

15. The method of claim 12, wherein the coal-combustion fly ash is blended dry into the existing roadbed soil before introducing the emulsion.

16. The method of claim 12, wherein the emulsion further comprises a lignin sulfonate and an emulsifier.

17. The method of claim 16, wherein the emulsion comprises a higher proportion of petroleum resin to lignin sulfonate when the existing roadbed soil is a coarse roadbed soil, and a lower proportion of petroleum resin to lignin sulfonate when the existing roadbed soil is a fine roadbed soil.

18. The method of claim 16, further comprising grinding at least the petroleum resin, the lignin sulfonate, and the emulsifier together in a colloidal mill to form the emulsion.

* * * * *